Patented May 4, 1937

2,079,023

UNITED STATES PATENT OFFICE 2,079,023

QUATERNARY ACRIDINIUM COMPOUNDS

Hans Mauss, Wuppertal-Barmen, and Fritz Mietzsch, Wuppertal-Elberfeld, Germany, assignors to Winthrop Chemical Company Inc., New York, N. Y., a corporation of New York No Drawing. Application January 7, 1935, Serial No. 800. In Germany January 13, 1934

9 Claims. (Cl. 260—36)

This invention relates to quaternary acridine compounds.

U. S. Patents Nos. 1,760,781, 1,766,403 and 1,889,704 describe amino acridine compounds which are substituted in their amino groups by basic radicals. The said basically substituted amino acridines are distinguished by a characteristic activity against blood parasites.

In accordance with the present invention new products of a considerable therapeutic action are obtainable by the manufacture of 9-aminoacridinium compounds containing the nuclear nitrogen atom in its quaternary form, and containing in the 9-amino group an aliphatic amine radical as substituent. The acridine ring system may contain further substituents, such as halogen atoms, alkyl, alkoxy and alkylmercapto groups which preferably stand in the 2-and/or 6-position of the acridine ring system. The nuclear quaternary nitrogen atom of the new acridinium compounds contains as a substituent an alkyl group or an aralkyl group, such as the benzyl and phenylethyl group. The quaternary compounds may be in the form of the quarternary base or in the form of the quaternary salts, for instance, salts with the hydrohalic acids, sulfuric acid, nitric acid, or also with organic acids, such as formic, acetic, lactic, tartaric and citric acid, or even higher molecular organic acids, such as aromatic hydroxy carbonic acids, for instance, methylene di-salicyclic acid or methylene di-(hydroxynaphthoic acid). The aliphatic amine radical substituting the 9-amino group may contain one or more nitrogen atoms and may contain hydroxyl and alkoxy groups as substituents. Furthermore, ether-like bound oxygen or sulfur atoms may be members of the aliphatic chain.

In accordance with the present invention the new 9-amino acridine compounds containing the nuclear nitrogen atom in its quaternary form and containing in the 9-amino group an aliphatic amine radical as substituent are obtainable by reacting upon 10-alkyl- or 10-aralkyl acridinium compounds containing in the 9-position a reactive substituent, for instance, halogen atoms, alkoxy, aryloxy, and aralkoxy, mercapto and etherified mercapto or even sulfo groups with an aliphatic polyamine containing at least one amino group in the primary or secondary form. Sometimes it is advisable to use such bases in which one amino group is substituted by a radical capable of being readily split off, for instance, by an acyl group. In such cases the said radical is split off after the reaction is complete. The aliphatic amine radical may also be introduced into the 9-amino group in several stages, for instance, by first reacting an amino alcohol or an amino-alkyl halide upon a 10-alkyl- or 10-arylalkyl acridinium compound which contains a reactive substituent in the 9-position. In this case the 9-hydroxy or halogenalkylamino derivatives primarily formed are subsequently reacted with a primary or secondary amine. It is advisable to transform the hydroxyalkylamino derivative referred to above into the halogenalkylamino compounds by means of a hydrohalic acid prior to the reaction with the primary or secondary amine.

It has further been found that amides of N-alkyl- or N-aralkyl-diphenylamine-2-carboxylic acids which are substituted at the amide nitrogen atom by an aliphatic amine radical may be subjected in the manner which is usual for the synthesis of acridine compounds from diphenylmine-2-carboxylic acids to ring closure to form the quaternary acridinium compounds specified.

The invention is further illustrated by the following examples without being restricted thereto:

*Example 1.*—13 grams of 9-chloro-10-methylacridinium chloride (prepared in accordance with Berichte der deutschen chemischen Gesellschaft, 32 (1899), page 1309) are dissolved in 60 grams of phenol at 100° C. 6 grams of asymmetric diethylaminoethylamine are slowly added to the melt drop by drop. The reaction is complete after one hours' heating to 100° C. After cooling the mixture is poured into ether while stirring, whereupon the transformation product separates in a semi-liquid state. It is separated, dissolved in water, filtered and decomposed with ammonia. The anhydro base of the 9-diethylamino-ethylamino-10-methylacridinium hydroxide precipitating is extracted with ether and dried. By means of an ethereal solution of hydrochloric acid the quaternary hydrochloride separates as a yellow, readily water-soluble crystal powder decomposing at about 200° C. The salt is of a remarkable yellow-green fluorescence in aqueous solution.

The 9-(alpha-diethylamino-delta-pentylamino)-10-methylacridinium chloride is obtained under corresponding conditions from 9-chloro-10-methylacridinium chloride and alpha-diethylamino-delta-aminopentane. It can be transformed from its aqueous solution into a yellow, water-insoluble powder by double decomposition with alkali metal salts of the methylenedisalicylic acid or other high molecular organic acids.

*Example 2.*—17 grams of 9-chloro-10-benzylacridinium-chloride (obtained by treating 10-benzylacridone melting at 179° C. with phosphorous pentachloride) are treated in 60 grams of phenol at 100° C. with 8 grams of alpha-diethylamino-delta-aminopentane. The cooled mixture is introduced into 2-normal caustic soda solution in order to remove the phenol, and the base separating is taken up in ether. Further purification is effected by shaking the thereal solution with acetic acid, decomposing the acetic acid solution with ammonia and renewed extraction with ether. By steam distillation the last traces of excess diamine are removed. From the ethereal solution the 9-(alpha-diethylamino-delta-pentylamino)-10-benzylacridinium citrate is precipitated with ethereal citric acid. It forms a yellow crystal powder which is readily soluble in water.

*Example 3.*—Under the same conditions 15 grams of 6.9-dichloro-10-methylacridinium chloride (obtained by treating 6-chloro-10-methylacridone melting at 173–174° C. with phosphorous pentachloride) in 60 grams of phenol are caused to react with 8 grams of alpha-diethylamino-delta-aminopentane. The 6-chloro-9-(alpha-diethylamino-delta-pentylamino)-10-methylacridinium chloride is transformed in aqueous solution by means of the sodium salt of the methylene-disalicylic acid or other organic acids into a yellow powder which is insoluble in water.

When starting with 6.9-dichloro-10-butylacridinium chloride (prepared from 6-chloro-10-butylacridone by treatment with phosphorous pentachloride) and alpha-dimethylamino-delta-aminobutane the 6-chloro-9-(alpha-dimethylamino-delta-butylamino)-10-butylacridinium chloride is obtained which is transformed in aqueous solution by means of the sodium salt of the methylene-di-2-hydroxy-3-naphthoic acid into a bright yellow powder which is soluble in alcohol, insoluble in water.

*Example 4.*—16 grams of 2-methoxy-6.9-dichloro-10-methylacridinium chloride (obtained by treating 2-methoxy-6-chloro-10-methylacridone melting at 236–237° C. with phosphorous pentachloride) are treated in 60 grams of phenol at 100° C. with 6 grams of asymmetric diethylaminoethylamine. Thus the 2-methoxy-6-chloro-9-diethylaminoethylamino-10-methylacridinium chloride decomposing at 225° C. is obtained which is readily soluble in water.

The hydrobromic acid and sulfuric acid salt are likewise readily soluble.

In the same manner 2-methoxy-6-chloro-9-(alpha-diethylamino-beta-hydroxy-gamma-propylamino)-10-methylacridinium chloride is obtained from 2-methoxy-6.9-dichloro-10-methylacridinium chloride and alpha-diethylamino-beta-hydroxy-gamma-aminopropane. It is readily soluble in water and decomposes at 220° C.

The 2-methoxy-6-chloro-9-(alpha-diethylamino-delta-pentylamino)-10-methylacridinium chloride is obtained from 2-methoxy-6.9-dichloro-10-methylacridinium chloride and alpha-diethylamino-delta-pentylamine. It can be transformed into the very readily soluble citrate by rendering the reaction mixture alkaline, extracting with ether and treating of the ethereal solution with an ethereal solution of citric acid. The tartaric acid salt obtained in an analogous manner is just as soluble.

The 2-methoxy-6-chloro-9-(alpha-ethylamino-gamma-propylamino)-10-ethylacridinium chloride is obtained from 2-methoxy-6.9-dichloro-10-ethylacridinium chloride (obtained by treating 2-methoxy-6-chloro-10-ethylacridone (melting at 211° C.) with phosphorous pentachloride) and alpha-ethylamino-gamma-aminopropane. It can be transformed into a very readily soluble formic acid or acetic acid salt.

*Example 5.*—13.9 grams of 2-methyl-9-chloro-10-methylacridinium chloride (obtained by treating 2.10-dimethylacridone melting at 150° C. with phosphorous pentachloride) and 8 grams of diallylamino-ethylamine in 60 grams of phenol are transformed into 2-methyl-9-diallylamino-ethylamino)-10-methylacridinium chloride which forms a strongly deliquescent powder when exposed to the air.

When starting with 2-methylmercapto-9-chloro-10-methylacridinium chloride and alpha-diethylamino-delta-aminopentane the 2-methylmercapto-9-alpha-diethylamino-delta-pentylamino-10-methylacridinium chloride is obtained which can be transformed into the citrate in accordance with the directions given in Example 4. The citrate forms an orange-yellow powder which is readily soluble in water.

We claim:—

1. A member of the class consisting of 9-amino-10-alkyl- and 9-amino-10-aralkyl-acridinium compounds, which compounds are substituted in the 9-amino group by an aliphatic amine radical.

2. 9-amino-10-alkylacridinium compounds, which compounds are substituted in the 9-amino group by an aliphatic amine radical.

3. 9-amino-10-alkylacridinium compounds, which compounds are substituted in the 9-amino group by a dialkyl-aminoalkyl radical.

4. 9-amino-10-methylacridinium halides which are substituted in the 9-amino group by an aliphatic amine radical.

5. 9-amino-10-methylacridinium halides which are substituted in the 9-amino group by a dialkyl-aminoalkyl radical.

6. 9-(alpha-diethylamino-delta-pentylamino)-10-methylacridinium halides.

7. 6-chloro-9-(alpha-diethylamino-delta-pentylamino)-10-methylacridinium chloride.

8. 2-methoxy-6-chloro-9-diethylaminoethylamino-10-methylacridinium chloride.

9. 2-methoxy-6-chloro-9-(alpha-diethylamino-delta-pentylamino)-10-methylacridinium chloride.

HANS MAUSS.
FRITZ MIETZSCH.